United States Patent
El-Moussa et al.

(10) Patent No.: US 10,594,659 B2
(45) Date of Patent: Mar. 17, 2020

(54) METHOD AND SYSTEM FOR SECURE COMMUNICATION WITH SHARED CLOUD SERVICES

(71) Applicant: British Telecommunications Public Limited Company, London (GB)

(72) Inventors: Fadi El-Moussa, London (GB); Ali Sajjad, London (GB)

(73) Assignee: British Telecommunications Public Limited Company, London (GB)

( * ) Notice: Subject to any disclaimer, the term of this patent is extended or adjusted under 35 U.S.C. 154(b) by 339 days.

(21) Appl. No.: 15/525,486

(22) PCT Filed: Nov. 4, 2015

(86) PCT No.: PCT/EP2015/075688
§ 371 (c)(1),
(2) Date: May 9, 2017

(87) PCT Pub. No.: WO2016/071390
PCT Pub. Date: May 12, 2016

(65) Prior Publication Data
US 2017/0302629 A1    Oct. 19, 2017

(30) Foreign Application Priority Data
Nov. 7, 2014 (EP) .................... 14192255

(51) Int. Cl.
*H04L 29/06* (2006.01)
*H04L 29/08* (2006.01)
(Continued)

(52) U.S. Cl.
CPC ...... *H04L 63/0272* (2013.01); *G06F 9/45558* (2013.01); *G06F 21/53* (2013.01);
(Continued)

(58) Field of Classification Search
CPC . H04L 63/0272; H04L 63/06; H04L 63/0435; H04L 69/14; H04L 12/4641;
(Continued)

(56) References Cited

U.S. PATENT DOCUMENTS 6,636,898 B1    10/2003  Ludovici et al.
2011/0261828 A1*  10/2011  Smith ............... H04L 12/462
                                                   370/401
(Continued)

FOREIGN PATENT DOCUMENTS

EP         2381363 A2       10/2011
WO    WO 2008/124560 A1    10/2008

OTHER PUBLICATIONS

International Search Report for corresponding International Application No. PCT/EP2015/075688 dated Jan. 19, 2016; 5 pages.
(Continued)

*Primary Examiner* — Alexander Lagor
*Assistant Examiner* — Vu V Tran
(74) *Attorney, Agent, or Firm* — Patterson Thuente Pedersen, P.A.

(57) ABSTRACT

A computer implemented method of secure communication between a virtual machine in a set of virtual machines in a virtualized computing environment and a shared software service over a network, the method comprising: establishing a network connection between the virtual machine and the software service; communicating data between the virtual machine and the software service; and establishing a tunneling virtual private network (VPN) connection for communication of encrypted network traffic between the virtual machine and the software service, access to the VPN connection being restricted so as to securely separate communication between the virtual machine and the software service from communication occurring with other virtual
(Continued)

machines in the set, and wherein data is communicated between the virtual machine and the software service via the VPN connection.

13 Claims, 3 Drawing Sheets

(51) Int. Cl.
  *G06F 21/60* (2013.01)
  *G06F 21/53* (2013.01)
  *H04L 12/46* (2006.01)
  *G06F 9/455* (2018.01)

(52) U.S. Cl.
  CPC ........ *G06F 21/606* (2013.01); *H04L 12/4641* (2013.01); *H04L 63/0435* (2013.01); *H04L 63/06* (2013.01); *H04L 67/10* (2013.01); *H04L 67/125* (2013.01); *H04L 69/14* (2013.01); *G06F 2009/45587* (2013.01)

(58) Field of Classification Search
  CPC ......... G06F 2009/45587; G06F 21/606; G06F 21/53; G06F 9/45558
  See application file for complete search history.

(56) References Cited

U.S. PATENT DOCUMENTS

| | | | | |
|---|---|---|---|---|
| 2012/0124573 | A1* | 5/2012 | Mamtani | H04N 21/233 |
| | | | | 718/1 |
| 2012/0233678 | A1* | 9/2012 | Pal | G06F 21/445 |
| | | | | 726/7 |
| 2014/0096230 | A1 | 4/2014 | Wade | |
| 2014/0129700 | A1* | 5/2014 | Mehta | H04L 43/0817 |
| | | | | 709/224 |
| 2014/0280810 | A1* | 9/2014 | Gabrielson | H04L 41/0806 |
| | | | | 709/222 |
| 2016/0219019 | A1* | 7/2016 | Mathur | H04L 63/0272 |
| 2017/0286083 | A1 | 10/2017 | Dimitrakos et al. | |
| 2017/0286136 | A1 | 10/2017 | Dimitrakos et al. | |

OTHER PUBLICATIONS

Written Opinion of the International Searching Authority for corresponding International Application No. PCT/EP2015/075688 dated Jan. 19, 2016; 7 pages.
Apple Support Communities, "How to configure the "Per App VPN" feature in iOS 7?" Accessed Feb. 9, 2014 https.//discussions.apple.com/thread/5318472; 5 pages.
Bitar et al., "Cloud networking: VPN applicability and NVo3 gap analysis," Internet Engineering Task Force, IETF; Standardworkingdraft, Internet Society (ISOC), (Oct. 21, 2013) XP015095534, draft-bitar-nvo3-vpn-applicability-02.txt; 60 pages.
Hao et al., "Secure cloud computing with a virtualized network infrastructure," Alcatel•Lucent (2010); 10 pages. https://www.usenix.org/legacy/event/hotcloud10/tech/slides/hao.pdf.
Kaufman, Lori M., "Can a trusted environment provide security?" IEEE Security & Privacy (Jan./Feb. 2010) vol. 6, No. 1, XP011300922; p. 50-52.
Microsoft, "How VPN Works: Virtual Private Network (VPN)," Updated Mar. 28, 2003; Accessed Feb. 9, 2014 https.//technet.microsoft.com/en-us/library/cc779919; 18 pages.
Super User, "Use VPN connection only for selected application," Accessed Feb. 9, 2014 http://superuser.com/questions/294008/use-vpn-connection-only-for-selected-application; 2 pages.
Application and Filing Receipt for U.S. Appl. No. 15/508,190, filed Mar. 2, 2017, Inventor(s): Dimitrakos et al.
Application and Filing Receipt for U.S. Appl. No. 15/508,209, filed Mar. 2, 2017, Inventor(s): Dimitrakos et al.

* cited by examiner

METHOD AND SYSTEM FOR SECURE COMMUNICATION WITH SHARED CLOUD SERVICES

CROSS-REFERENCE TO RELATED APPLICATIONS

The present application is a National Phase entry of PCT Application No. PCT/EP2015/075688, filed on 4 Nov. 2015, which claims priority to EP Patent Application No. 14192255.9, filed on 7 Nov. 2014, which are hereby fully incorporated herein by reference.

TECHNICAL FIELD

The present disclosure relates to software application deployment. In particular it relates to the deployment of software applications with security resources in a virtualized computing environment.

BACKGROUND

Historically, organizations and businesses developed or acquired bespoke or off-the-shelf software solutions for execution using dedicated computer hardware. Such software solutions find broad application in many varied areas of business such as: financial management; sales and order handling; record storage and management; human resource record management; payroll; marketing and advertising; internet presence; etc. The acquisition, management and maintenance of such software and hardware can require costly investment in systems development, management and revision—functions that can extend beyond the core business concerns of an organization.

As organizations increasingly seek to decouple such systems management from their core business processes to control costs, breadth of concern and liabilities, dedicated service offerings are provided to take the place of in-house systems. Computer systems are increasingly provided by third parties as services in the same way as utilities, a shift that has been partly facilitated by improvements in the availability of high-speed network connections allowing consuming businesses to access and use networked third party systems. Such systems can include substantially all aspects of a business computer system including hardware, operating systems software, file systems and data storage software including database applications and the like, middleware and transaction handling software, and commercial software. In this way consuming businesses can be relieved of concerns relating to the exact nature, arrangement and management of computing systems and focus resources elsewhere. The computing system is abstracted from the consuming business and can be logically thought of as a 'cloud' in which all system concerns are encapsulated and at least partly managed by a third party. Thus, such arrangements are known as "cloud computing."

Service providers can provide computing infrastructure on a service basis using hardware shared by multiple systems employing virtualization software. Such services can be described as virtualized computing environments in which applications can be deployed to execute within virtual machines (VMs) executing in the virtualized environment. VMs can be managed by hypervisor software and the like.

The provision of computing resources and facilities "as a service" extends beyond the virtualization of computing systems. Commoditized software offerings are increasingly popular as applications developers seek to utilize the facilities of third party service providers for discrete software services. For example, network security services such as network firewall services, intrusion detection/prevention services, security patch management services, anti-malware services, deep packet inspection and virus detection services can be provided by dedicated security service providers. An example of such services is known as Intelligent Protection Services available from BT Cloud Compute virtualized computing services. With such services, an application within a VM of a virtualized computing environment communicates with a shared software service, such as a malware detection service, which service may be provided anywhere in a virtualized computing environment or in another computing environment. Communication between the VM and the shared software service is via a network such as a TCP/IP network. The shared software service is shared between multiple, potentially very many, service consumers such as VMs and applications executing within VMs. Such service consumers can be from different organizations sharing data that is sensitive or confidential. Accordingly, while the software service is shared, the security of information processed by the software service on behalf of potentially many disparate consumers must not be compromised.

For example, FIG. 1 is a component diagram of a networking arrangement for communication between VMs 102, 104, 106 in a virtualized computing environment and a shared software service 108. Each VM is a virtualized computing instance in the virtualized computing environment, such as a VM supported by a hypervisor system or multiple virtual system environment. Notably, the locations, configurations, implementations and arrangements of each of the VMs 102, 104, 106 can be similar, identical or disparate. Each VM 102, 104, 106 executes software such as a software stack including an operating system, middleware and application software, any combination of which can be considered an "application". A VM can execute multiple applications, whether cooperating or not. Each VM 102, 104, 106 communicates with a shared software service 108. The service 108 is a software, hardware or combination function, feature, application or facility accessible to and used by potentially many different VMs and applications executing within VMs. For example, the shared software service 108 is a malware detection service that receives data and scans the data to detect malware. Such a service can be provided external to any particular application consuming the service and can be shared by multiple such applications, which can be advantageous due to the centralization of the facility as a specialized service 108 which is particularly suited to fulfilling this function, is routinely and centrally updated and may be configured with a particular virtualized or physical computing environment to optimize its effectiveness, efficiency and performance. The service 108 provides facilities for multiple consumers such as multiple VMs 102, 104, 106 in any one of a number of ways. For example, the service 108 can execute different threads 120, 122, 124, processes or subroutines for each VM such that, for example, a single thread or group of threads undertakes the function of the service 108 for a particular consuming VM. In this way the service 108 can separate its functionality and instances of its functionality for each discrete consuming VM, and inter-thread or inter-process security measures can be employed to protect information and processing occurring in each thread of execution. The shared service 108 will also include a network entrypoint 110 as an interface to the network via which communication from consuming VMs is received. The network entrypoint 110 can be a process, thread or function in its own right and can execute in association with a network address of the service 108 to communicate with consuming VMs 102, 104, 106 via a communications network 100.

The VMs 102, 104 and 106 can be separate and unrelated. For example, each of the VMs 102, 104, 106 may be executing for or on behalf of a different organization. In consuming the shared service 108, each VM communicates data to the service 108, such as data for which a malware scan is required. Such data is communicated via the communications network 100. The communications network 100 includes network elements 112 such as network routers, switches, base-stations and the like. The VMs 102, 104, 106 require that their data is kept private, secret and secure such that other VMs cannot access such data. Such a requirement can be for confidentiality, secrecy or other requirements. Further, a requirement to keep data communicated by or to VMs separate can arise to avoid cross-contamination, infection or transmission of malicious code, software, viruses, malware and the like between VMs or applications executing in VMs. Accordingly, the VMs employ "virtual local area networks" or VLANs to achieve a separation between their network communications. A VLAN is a virtual network known in the art that provides a low-latency virtual local area network connection between multiple separated (e.g. distributed) physical local area networks. The implementation of a VLAN is achieved at a low level in a network stack (such as layer 2—the data layer) and is supported by network elements 112. The network elements 112 provide VLAN separation between multiple VLANs 114, 116, 118 based on hardware or media access control (MAC) address information. For example, a VLAN can be implemented in network switches using endpoint MAC addresses and the Ethernet protocol (even where endpoints are virtualized, such as in a virtual computing environment).

Accordingly, each VM 102, 104, 106 communicates with the service 108 via a different VLAN 114, 116, 118. The VLANs provide for separation of network communication and can even be effective where the VMs are co-hosted in the same virtualized computing environment. For example, a typical usage scenario can involve multiple virtual computing environment consumers having different VMs hosted in different cloud service provider platforms, with each consumer wishing to use the services offered by the shared software service 108, such as to filter network traffic received by each VM. Due to the sensitive nature of the network traffic, isolation of communication with the shared service 108 is achieved by associating each VM with a unique VLAN so that traffic from different VMs cannot pass through the same VLAN and traffic isolation is achieved.

The use of VLANs in this way is not fully effective and has considerable drawbacks. Firstly, while the traffic is isolated during passage through the network 100, it must be communicated to the service 108 through the service network entrypoint 110. The service 108 can undertake separate isolated threads of execution to isolate processing for different VMs, but the initial communication via the interface of the service 108 by way of the entrypoint 110 constitutes a security weakness in the isolation of network communication for the VMs. This is because a single entrypoint 110, such as a single network address with one or a small number of discrete network sockets will be employed and a receiving process, such as a daemon process, server process, gatekeeper process, polling process or the like, constituting at least part of the entrypoint 110 will receive all communication from all VLANs before directing such communication to an appropriate thread for processing. Such directing of traffic may be explicit, like a routing or forwarding step, or may be implied by an association between each of the threads and a socket, sockets, handle or hook into or out of the network entrypoint 110. The point of weakness is indicated, by way of example, at 128.

Further, the use of VLANs includes considerable limitations because a maximum number of VLANs is limited by a number of VLANs supported by network elements 112. Some network elements such as switches and routers can support only 255 VLANs consecutively which imposes an unrealistically low limit where a number of VMs communicating over a network (such as the internet) can easily exceed this. Yet further, VLANs are arranged to be VM specific. Where a consumer of a virtualized computing environment deploys multiple different applications within a single virtual machine, each application will share the same VLAN for communication. Accordingly, sensitive information associated with one application can be accessed by the other application sharing the same VLAN and any network security compromise, such as a virus or malware attack, may traverse between the applications due to the shared network facilities using the same VLAN.

FIG. 2 is a component diagram of a networking arrangement for communication between applications 230, 232 in a VM 102 in a virtualized computing environment and a shared software service 108. Many of the features of FIG. 2 are identical to those described above with respect to FIG. 1. VM 102 has two applications 230, 232 in execution and each communicating with the shared service 108. In one arrangement, the applications require separation of their network communications for reasons of sensitivity or security. However, since the virtualized computing environment provides network traffic isolation on a VM basis by way of the VLAN 114, both applications communicate with the service 108 using the same VLAN. Accordingly, there is a point of weakness, indicated at 228, where network communications from both applications are not isolated as traffic is communicated via the same VLAN.

It would therefore be advantageous to provide for secure isolation of network traffic for virtualized computing systems such as virtual machines and applications executing therein consuming shared software services without the aforementioned shortcomings.

SUMMARY

The present disclosure accordingly provides, in a first aspect, a computer implemented method of secure communication between a virtual machine in a set of virtual machines in a virtualized computing environment and a shared software service over a network, the method comprising: establishing a network connection between the virtual machine and the software service; communicating data between the virtual machine and the software service; and establishing a tunneling virtual private network (VPN) connection for communication of encrypted network traffic between the virtual machine and the software service, access to the VPN connection being restricted so as to securely separate communication between the virtual machine and the software service from communication occurring with other virtual machines in the set, and wherein data is communicated between the virtual machine and the software service via the VPN connection.

In some embodiments, the VPN connection is established based on VPN parameters retrieved securely from a node in the network.

In some embodiments, the node in the network is a computer system arranged to define at least part of a distributed hash table storing VPN connection information retrievable using a hashing function based on a parameter identifying the virtual machine and a parameter identifying the software service.

In some embodiments, the VPN connection information includes: a network address of the software service; and a symmetric key to encryption and decrypt data for communication via the VPN connection.

In some embodiments, the network is a physical communications network and the VPN connection forms a virtual overlay network for the physical communications network, and wherein the node in the network is a super node server of the virtual overlay network.

In some embodiments, a plurality of software applications execute in the virtual machine and establishing a VPN connection comprises establishing the VPN connection between a first software application and the software service, wherein access to the VPN connection is restricted, in the virtual machine, to the first software application so as to securely separate communication between the first application and the software service from communication occurring with other applications in the plurality of software applications.

In some embodiments, the parameter identifying the virtual machine further includes an identification of the first software application.

In some embodiments, the software service includes a plurality of threads of execution, each thread of execution being securely separated from other threads of the software service, and wherein the VPN connection is established for communication between the virtual machine and a particular thread of execution of the software service.

The present disclosure accordingly provides, in a second aspect, a network connected computer system comprising: an interface communicatively coupled to the network; a memory; and a processor wherein the memory stores at least part of a distributed hash table storing tunneling virtual private network (VPN) connection information retrievable using a hashing function based on a parameter identifying a requester and a parameter identifying a software service, the VPN connection information being suitable for establishing a secure VPN connection between the requester and the software service; wherein the computer system is arranged to receive, via the interface, a request to access a shared software service accessible via the network, the request including an identification of a requester and an identification of the software service, and wherein the processor is arranged to retrieve VPN connection information from the memory based on the identification of a requester and the identification of the software service received via the interface.

In some embodiments, the requester is a virtual machine in a set of virtual machines of a virtualized computing environment.

In some embodiments, the requester is an application from a plurality of applications executing in a virtual machine in a set of virtual machines of a virtualized computing environment.

In some embodiments, the VPN connection information is restricted so as to securely separate communication between the virtual machine and the software service from communication occurring with other virtual machines in the set.

In some embodiments, the VPN connection information is restricted so as to securely separate communication between the application in the virtual machine and the software service from communication occurring with other applications in the plurality of applications.

In some embodiments, the VPN connection information includes: a network address of the identified software service; and a symmetric key to encryption and decrypt data for communication via a VPN connection.

The present disclosure accordingly provides, in a third aspect, a computer program element comprising computer program code to, when loaded into a computer system and executed thereon, cause the computer to perform the method set out above.

BRIEF DESCRIPTION OF THE DRAWINGS

An embodiment of the present disclosure will now be described, by way of example only, with reference to the accompanying drawings, in which:

FIG. 4 is a component diagram of a networking arrangement for communication between virtual machines 402, 404, 406 in a virtualized computing environment and a shared software service 408 in accordance with embodiments of the present disclosure.

DETAILED DESCRIPTION

Figure 3:
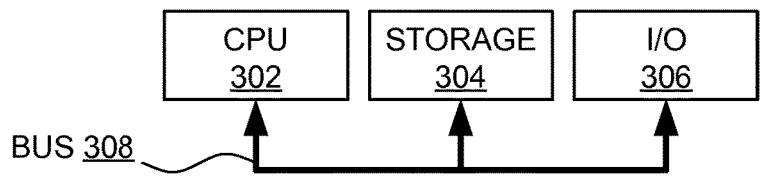
FIG. 3 is a block diagram of a computer system suitable for the operation of embodiments of the present disclosure.

Referring to FIG. 3, a central processor unit (CPU) 302 is communicatively connected to a storage 304 and an input/output (I/O) interface 306 via a data bus 308. The storage 304 can be any read/write storage device such as a random access memory (RAM) or a non-volatile storage device. An example of a non-volatile storage device includes a disk or tape storage device. The I/O interface 306 is an interface to devices for the input or output of data, or for both input and output of data. Examples of I/O devices connectable to I/O interface 306 include a keyboard, a mouse, a display (such as a monitor) and a network connection.

Figure 1:
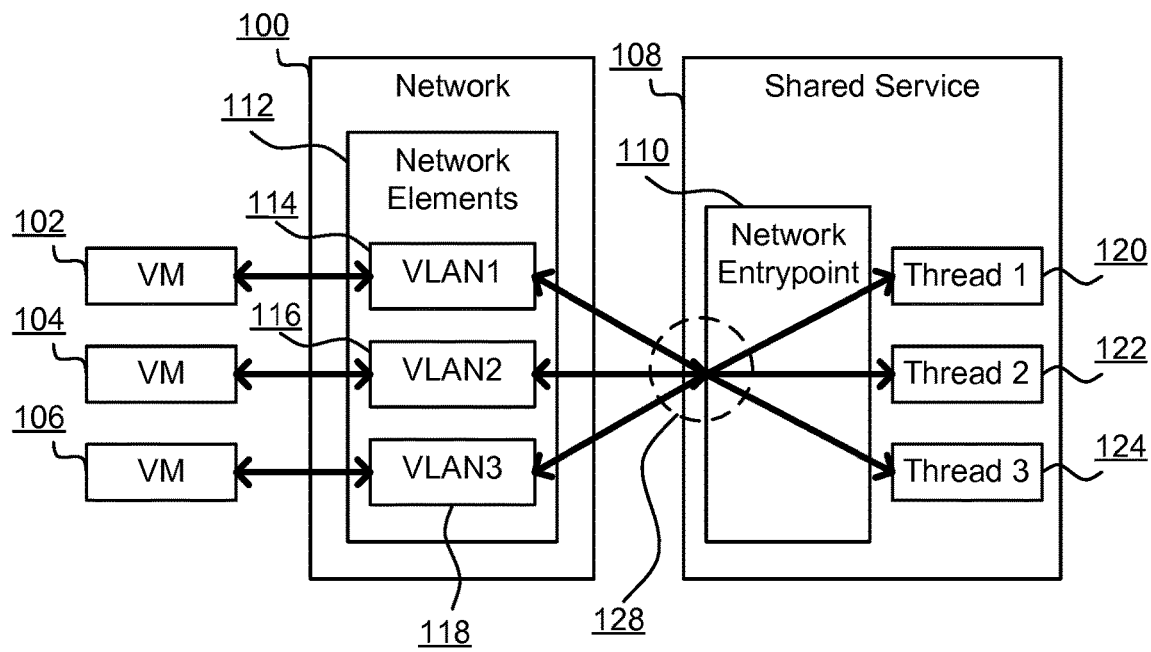
FIG. 1 is a component diagram of a networking arrangement for communication between virtual machines in a virtualized computing environment and a shared software service.
Figure 4:
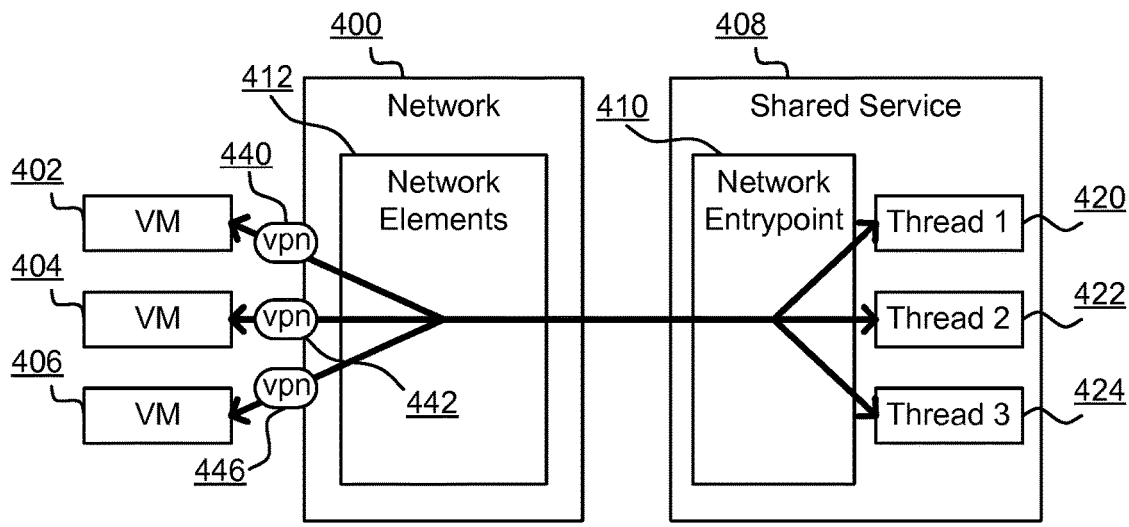
FIG. 4 is a component diagram of a networking arrangement for communication between virtual machines in a virtualized computing environment and a shared software service in accordance with embodiments of the present disclosure.

Many of the features of FIG. 4 are the same as those described above with respect to FIG. 1 and these will not be repeated here. In the arrangement of FIG. 4, each of the VMs 402, 404, 406 communicates with the service 408 via the communications network 400 as hereinbefore described. However, the use of VLANs is not necessary (though may optionally be preferred). Instead, each VM establishes a separate tunneling virtual private network (VPN) connection 440, 442, 446 for communication with a particular thread 420, 422, 424, process or instance of the shared service 108. Specifically, the VPN connection is established and occurs between a particular VM (or an application executing in the virtual machine, as described below) and a thread executed by the service 408 to provide facilities for the VM. The VPN connection is not established with the network entrypoint 410, and the network entrypoint 410 is not able to access network traffic communicated by the VPN connection. Similarly, the VPN connection is not established with any of the network elements 412, and the network elements 412 are not able to access network traffic communicated by the VPN connection. Accordingly, the communication between the VM (or application) and corresponding thread of the service 408 is secure along its entire communication path.

A tunneling VPN connection is a virtual connection that enables the encapsulation of one type of network protocol unit (e.g. a packet) within a different network protocol unit (e.g. a datagram). For example, Microsoft® Windows® VPN connections can use Point-to-Point Tunneling Protocol (PPTP) packets to encapsulate and send private network traffic, such as TCP/IP traffic over a public network such as the Internet. For PPTP and Layer Two Tunneling Protocol (L2TP) a tunnel is similar to a session. Both of the tunnel endpoints (e.g. a VM 402, 404, 406 or application and the service 408) must agree to the tunnel and must negotiate configuration variables, such as address assignment, encryption, or compression parameters. In some embodiments, data transferred across the tunnel is sent using a datagram-based protocol. A tunnel management protocol can be used as a mechanism to create, maintain, and terminate the tunnel. After a tunneling VPN connection is established between VPN endpoints (e.g. VM and thread), data can be sent via the VPN connection and is encrypted so that it cannot be discovered as it is communicated by the network 400.

Thus, using a VPN connection between a VM and service endpoint such as a thread of the shared software service, network traffic communicated between the VM and the service 408 is secure against disclosure due to encryption and there is no common access to network traffic for multiple VMs at a point in the network 400 or at the network entrypoint 410 of the service 408.

Figure 2:
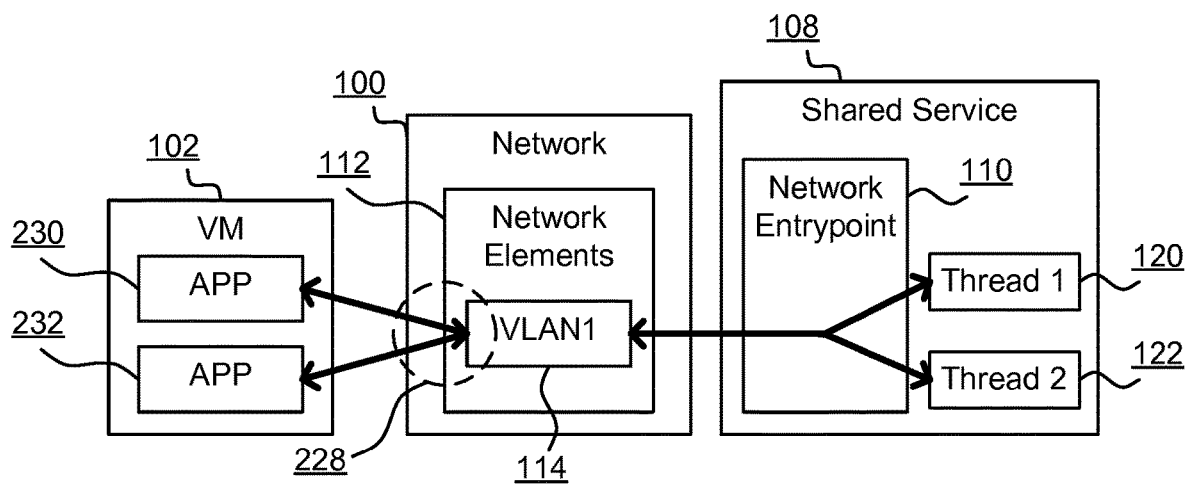
FIG. 2 is a component diagram of a networking arrangement for communication between applications in a virtual machine in a virtualized computing environment and a shared software service.
Figure 5:
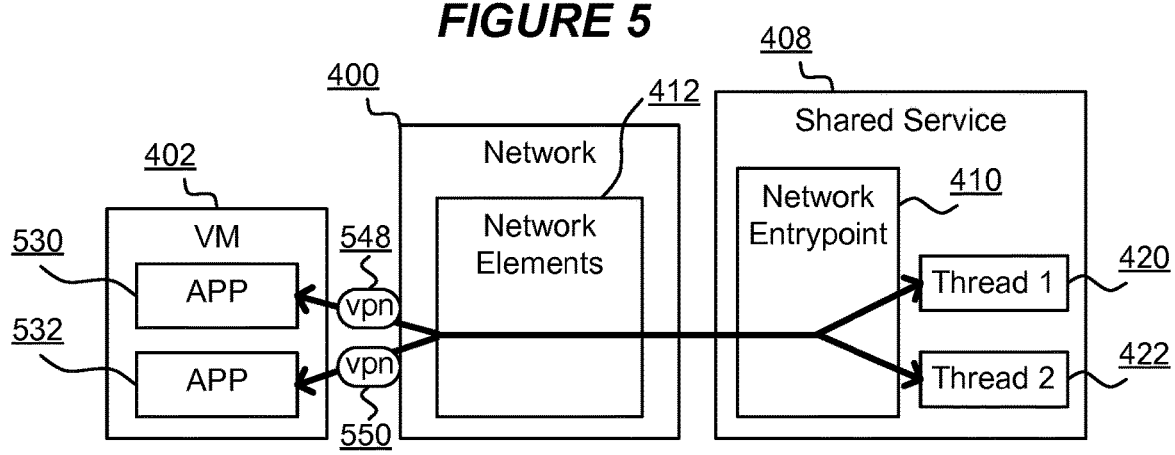
FIG. 5 is a component diagram of a networking arrangement for communication between applications in a virtual machine in a virtualized computing environment and a shared software service in accordance with embodiments of the present disclosure.

FIG. 5 is a component diagram of a networking arrangement for communication between applications 530, 532 in a virtual machine 402 in a virtualized computing environment and a shared software service 408 in accordance with embodiments of the present disclosure. Many features of the arrangement of FIG. 5 are similar to those described above with respect to FIG. 2 and these will not be repeated here. The multiple applications 530, 534 of FIG. 5 secure their respective network traffic using distinct VPN connections 548 and 550 that are application specific. The VPN connections 548 and 550 provide secure, encrypted and logically isolated transfer of network traffic between each application 530, 532, respectively, and the threads 420, 422 of the shared service 408. Accordingly, while the applications 530, 532 are provided by the same VM 402 there is no access to network traffic for either application at any point in the network 412 or at the network entrypoint 410 of the service 408 and any security vulnerability exploited at one connection cannot transfer to another connection.

Figure 6:
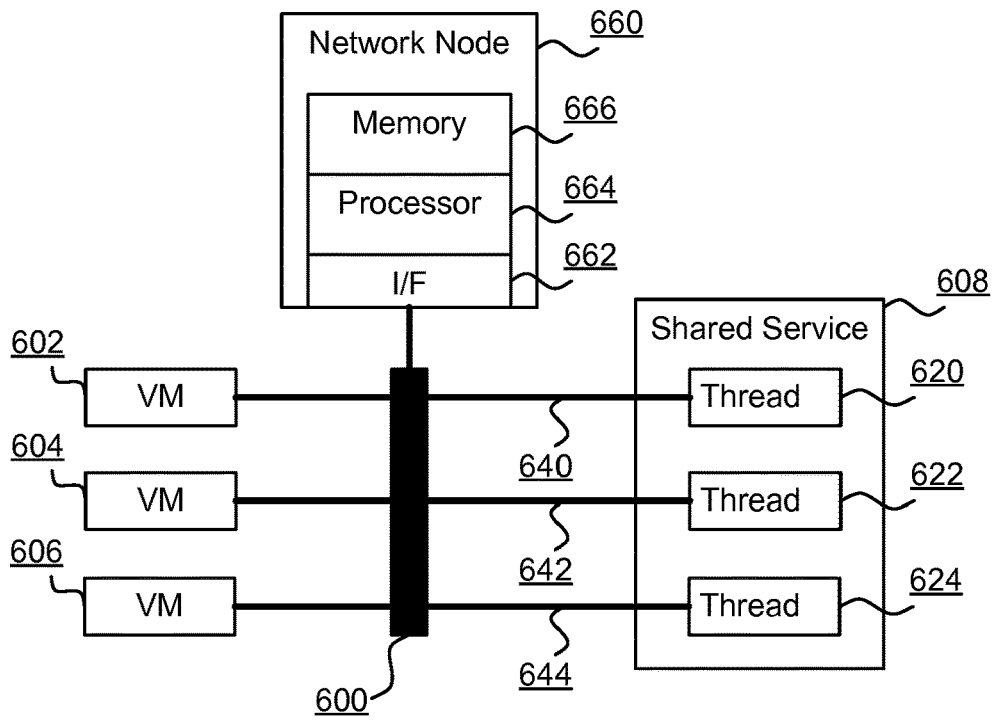
FIG. 6 is a further component diagram of a networking arrangement for communication between virtual machines in a virtualized computing environment and a shared software service in accordance with embodiments of the present disclosure.

FIG. 6 is a further component diagram of a networking arrangement for communication between virtual machines 602, 604, 606 in a virtualized computing environment and a shared software service 6-8 in accordance with embodiments of the present disclosure.

In one embodiment, a VPN connection established by a VM or application is based on parameters retrieved securely from a node in the network 400. FIG. 6 is a flowchart of a method of secure communication between a virtual machine 602 in a set of virtual machines 602, 604, 606 in a virtualized computing environment and a shared software service 608 in accordance with embodiments of the present disclosure. The arrangement of FIG. 6 is generally consistent with that described above with respect to FIG. 4 and it will also be appreciated by those skilled in the art, on the basis of the teachings herein, that the multiple application arrangement of FIG. 5 could equally be adapted to employ the features of FIG. 6 as are described hereinbelow.

Multiple VMs 602, 604, 606 communicate with respective threads 620, 622, 624 of a shared software service 608 via network connections 640, 642, 644 over a communications network 600. Each network connection 640, 642, 644 is a VPN connection providing encrypted communication between a VM (or application) and thread of the service 608. A network node 660 is a hardware, software, firmware or combination component communicatively connected to the network 600 for providing VPN connection information to VMs 602, 604, 606 (or applications executing therein). For example, the network node 660 is a network connected computer system or a network element or appliance connected to the network 600. The network node 660 includes: an interface 662 providing the communicative coupling to the network 600 and via which requests are received from requesters (such as VMs and applications executing within VMs) for VPN connection information; a memory 666 such as a volatile or non-volatile memory, data store, database or the like; and a processor 664 such as a physical microprocessor or virtual processor or processing element.

The memory 666 stores at least part of a hash table such as a distributed hash table. The hash table is a data structure in which can be stored VPN connection information for the establishment of VPN connections. The VPN connection information is stored and accessed in the hash table by way of a hashing function which uniquely identifies a VPN connection entry in the hash table based on parameters. The parameters for the hashing function include at least: a parameter identifying a requester for a VPN connection; and a parameter identifying a software service with which the requester wishes to communicate.

In some embodiments of the present disclosure, requesters such as VMs and applications executing in VMs register with the network node 660 to obtain VPN connection information for securely connecting to a shared software service 608. Such registration can involve the requester providing a requester identifier and an identifier of the required service 608. The network node 660 receives such a request via the interface 662 and the processor 664 generates a new VPN connection information entry in the hash table of the memory 666 using the hashing function. The new VPN connection information entry includes VPN connection information such as connection setup information including: a network address such as an IP address of the identified shared software service 608; a port number of the service 608, which may be a particular port configured for a new request; and a symmetric encryption key for communicating via a VPN connection. The VPN connection information can additionally include policy information governing a new VPN connection such as a start time/date, end time/date and/or period of validity of the VPN connection, an expiry period or date/time, a definition of or restriction to the type or volume of network traffic, a type of encryption algorithm or standard or encryption parameters to be used etc. (Notably, while symmetric encryption has been described, it will be appreciated that negotiated asymmetric encryption could alternatively be employed.)

Once generated, the VPN connection information can be communicated securely to the requester (VM or application) such as by wrapping the VPN connection information in a logical wrapper and/or encrypting the policy information using public/private key encryption. The VPN connection information can be re-requested and/or re-provided to a VM or application by the network node 660 by reference to the hash table on the basis of the hashing algorithm and the requester and service identifiers. The VPN connection information is specific to a particular requester (VM or application) and a specific shared service 608 and access to the VPN connection information is restricted so as to securely separate communication between the virtual machine and the software service from communication occurring with other virtual machines.

In one embodiment the network node 660 further provides at least part of the VPN information to the service 606, such as securely communicating the symmetric key to the service 606. Further, in some embodiments the network node 660 cooperates with the service 608 to provide VPN connection information on a thread-specific basis such that the service identifier is a specific thread, process or instance of the shared software service 608 in order that a VPN connection can be specific to a particular thread, process or instance to provide secure and isolated communication between VMs (or applications) and individual service instances (e.g. threads) providing the shared software service.

Thus, in use a requester (VM or application executing in a VM) initially registers with the network node 660 a requirement to access the shared service 608, providing an identifier of the requester and an identifier of the shared service 608. The network node 660 generates VPN connection setup information for communication between the requester and the shared service 608, preferably in communication with the shared service 608 so as to provide VPN connection information that is specific to an instance, thread or process of the shared service 608. The VPN connection information is stored in a hash table in the memory 666 of the network node 660 and securely provided to the requester. The requester subsequently establishes a new secure tunneling VPN connection, such as an IPSec connection, with an identified thread, process or instance of the shared service 608. The VPN connection provides secure and isolated communication for all network traffic between the requester and the particular thread, process or instance of the shared service without compromising the security of the network traffic between VMs (or between applications of the VM, where the connection is established by a particular application executing in a VM).

In one embodiment a VPN connection forms a virtual overlay network over a physical communications network 600. In such an embodiment, the network node 660 can be conveniently and/or efficiently implemented in a Super Node Server or Service of the virtual overlay network.

Figure 7:
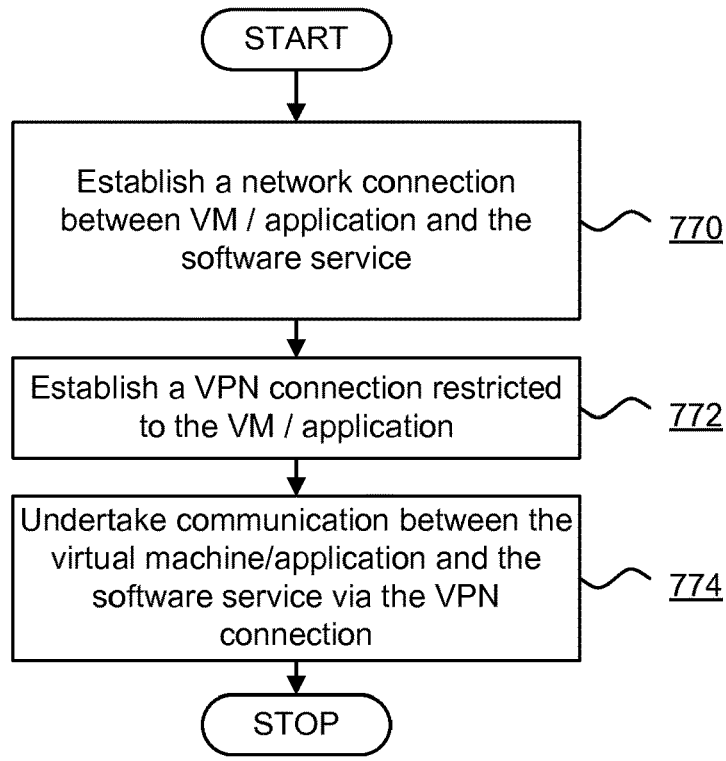
FIG. 7 is a flowchart of a method of secure communication between a virtual machine in a set of virtual machines in a virtualized computing environment and a shared software service in accordance with embodiments of the present disclosure.

FIG. 7 is a flowchart of a method of secure communication between a virtual machine 602 in a set of virtual machines 602, 604, 606 in a virtualized computing environment and a shared software service 608 in accordance with embodiments of the present disclosure. Initially, at 770, a network connection is established between the VM 602 (or application) and the software service 608 via the physical communications network 600. At step 772 a VPN connection is established between the VM 602 (or application) and the service 608, the connection being restricted to the particular VM 602 (or application). This restriction can be provided by, for example, restricting access to the VPN connection information by the network node 660. Subsequently, at 774, secure and isolated communications can be undertaken between the VM 602 (or application) and the software service 608.

Insofar as embodiments of the disclosure described are implementable, at least in part, using a software-controlled programmable processing device, such as a microprocessor, digital signal processor or other processing device, data processing apparatus or system, it will be appreciated that a computer program for configuring a programmable device, apparatus or system to implement the foregoing described methods is envisaged as an aspect of the present disclosure. The computer program may be embodied as source code or undergo compilation for implementation on a processing device, apparatus or system or may be embodied as object code, for example.

Suitably, the computer program is stored on a carrier medium in machine or device readable form, for example in solid-state memory, magnetic memory such as disk or tape, optically or magneto-optically readable memory such as compact disk or digital versatile disk etc., and the processing device utilizes the program or a part thereof to configure it for operation. The computer program may be supplied from a remote source embodied in a communications medium such as an electronic signal, radio frequency carrier wave or optical carrier wave. Such carrier media are also envisaged as aspects of the present disclosure.

It will be understood by those skilled in the art that, although the present disclosure has been described in relation to the above described example embodiments, the disclosure is not limited thereto and that there are many possible variations and modifications which fall within the scope of the disclosure.

The scope of the present disclosure includes any novel features or combination of features disclosed herein. The applicant hereby gives notice that new claims may be formulated to such features or combination of features during prosecution of this application or of any such further applications derived therefrom. In particular, with reference to the appended claims, features from dependent claims may be combined with those of the independent claims and features from respective independent claims may be combined in any appropriate manner and not merely in the specific combinations enumerated in the claims.

The invention claimed is:

1. A computer implemented method of secure communication between a virtual machine in a set of virtual machines in a virtualized computing environment and a shared software service over a virtual overlay network, the method comprising:
    establishing a network connection between the virtual machine and the shared software service;
    communicating data between the virtual machine and the shared software service; and
    establishing a tunneling virtual private network (VPN) connection for communication of encrypted network traffic between the virtual machine and a thread of the shared software service based on VPN connection information retrievable using a parameter identifying the virtual machine and a parameter identifying the shared software service, wherein the VPM connection information is stored in a distributed hash table inside a network node, wherein the network node is a service of the virtual overlay network, wherein access to the VPN connection is restricted so as to securely separate communication between the virtual machine and the thread of the shared software service from communication occurring with other virtual machines in the set, and wherein data is communicated between the virtual machine and the thread of the shared software service via the VPN connection.

2. The method of claim 1, wherein the VPN connection information includes: a network address of the shared software service; and a symmetric key to encrypt and decrypt data for communication via the VPN connection.

3. The method of claim 1, wherein the virtual overlay network is a physical communications network and the VPN connection forms the virtual overlay network for the physical communications network, and wherein the node in the virtual overlay network is a super node server of the virtual overlay network.

4. The method of claim 1, wherein a plurality of software applications execute in the virtual machine, and establishing a VPN connection comprises establishing the VPN connection between a first software application and the shared software service, wherein access to the VPN connection is restricted, in the virtual machine, to the first software application so as to securely separate communication between the first application and the shared software service from communication occurring with other applications in the plurality of software applications.

5. The method of claim 4, wherein the parameter identifying the virtual machine further includes an identification of the first software application.

6. The method of claim 1, wherein the shared software service includes a plurality of threads of execution, each thread of execution being securely separated from other threads of the shared software service, and wherein the VPN connection is established for communication between the virtual machine and a particular thread of execution of the shared software service.

7. A network connected computer system comprising:
an interface communicatively coupled to the network;
a memory; and
a processor,
wherein the memory stores at least part of a distributed hash table storing tunneling virtual private network (VPN) connection information retrievable using a hashing function based on a parameter identifying a requester and a parameter identifying a shared software service, the VPN connection information being suitable for establishing a secure VPN connection between the requester and the shared software service over a virtual overlay network, wherein the computer system is arranged to receive, via the interface, a request to access a thread of the shared software service accessible via the virtual overlay network, the request including an identification of a requester and an identification of the shared software service, wherein the processor is arranged to retrieve VPN connection information from the memory based on the identification of a requester and the identification of the shared software service received via the interface, and facilitate a secure VPN connection between the requester and the shared software service based on the retrieved VPN connection information, wherein access to the VPN connection is restricted so as to securely separate communication between the virtual machine and the thread of the shared software service from communication occurring with other virtual machines in the set, and wherein data is communicated between the virtual machine and the thread of the shared software service via the VPN connection.

8. The computer system of claim 7, wherein the requester is a virtual machine in a set of virtual machines of a virtualized computing environment.

9. The computer system of claim 7, wherein the requester is an application from a plurality of applications executing in a virtual machine in a set of virtual machines of a virtualized computing environment.

10. The computer system of claim 8, wherein the VPN connection information is restricted so as to securely separate communication between the virtual machine and the shared software service from communication occurring with other virtual machines in the set.

11. The computer system of claim 9, wherein the VPN connection information is restricted so as to securely separate communication between the application in the virtual machine and the shared software service from communication occurring with other applications in the plurality of applications.

12. The computer system of claim 7, wherein the VPN connection information includes: a network address of the identified shared software service; and a symmetric key to encrypt and decrypt data for communication via a VPN connection.

13. A non-transitory computer-readable storage medium storing computer program code to, when loaded into a computer system and executed thereon, cause the computer system to perform the method as claimed in claim 1.

* * * * *